(12) United States Patent
Rohl

(10) Patent No.: US 8,162,068 B2
(45) Date of Patent: Apr. 24, 2012

(54) PILOT VALVE, METHOD OF USING, AND FLUID SYSTEM EQUIPPED THEREWITH

(75) Inventor: Jeff Rohl, Three Oaks, MI (US)

(73) Assignee: Vanair Manufacturing, Inc., Michigan City, IN (US)

( * ) Notice: Subject to any disclaimer, the term of this patent is extended or adjusted under 35 U.S.C. 154(b) by 533 days.

(21) Appl. No.: 12/484,496

(22) Filed: Jun. 15, 2009

(65) Prior Publication Data

US 2009/0308461 A1    Dec. 17, 2009

Related U.S. Application Data

(60) Provisional application No. 61/061,248, filed on Jun. 13, 2008.

(51) Int. Cl.
*A62C 35/00* (2006.01)

(52) U.S. Cl. .............. 169/13; 137/88; 137/98; 137/899; 137/494; 137/492.5; 417/295; 417/298

(58) Field of Classification Search .................... 137/88, 137/98, 100, 104, 107, 114, 494, 495, 492.5, 137/490, 488, 899, 899.4; 417/295, 298; 169/13, 62

See application file for complete search history.

(56) References Cited

U.S. PATENT DOCUMENTS

| | | | | |
|---|---|---|---|---|
| 1,483,044 A * | 2/1924 | Hoffman et al. | ............. | 417/228 |
| 1,484,674 A * | 2/1924 | Redfield | ............. | 417/302 |
| 2,501,706 A * | 3/1950 | Bent | ............. | 137/494 |
| 2,556,623 A * | 6/1951 | Lipkau | ............. | 417/295 |
| 2,925,824 A * | 2/1960 | Rockwell | ............. | 137/490 |
| 3,493,005 A * | 2/1970 | Kakegawa | ............. | 137/100 |
| 3,994,357 A * | 11/1976 | Smitley | ............. | 180/282 |
| 4,064,891 A * | 12/1977 | Eberhardt | ............. | 137/98 |
| 4,250,908 A * | 2/1981 | Velie | ............. | 137/7 |
| 4,295,489 A * | 10/1981 | Arends et al. | ............. | 137/488 |
| 4,981,178 A * | 1/1991 | Bundy | ............. | 169/9 |
| 4,998,862 A * | 3/1991 | Hutchinson | ............. | 417/28 |
| 5,060,630 A * | 10/1991 | Boals | ............. | 122/14.31 |
| 5,255,747 A * | 10/1993 | Teske et al. | ............. | 169/15 |
| 5,411,100 A * | 5/1995 | Laskaris et al. | ............. | 169/14 |
| 5,411,375 A * | 5/1995 | Bauer | ............. | 417/295 |
| 6,009,953 A * | 1/2000 | Laskaris et al. | ............. | 169/13 |
| 6,309,185 B1 * | 10/2001 | Shen | ............. | 417/295 |
| 6,564,826 B2 * | 5/2003 | Shen | ............. | 137/505.18 |
| 6,814,099 B2 * | 11/2004 | Shen | ............. | 137/505.18 |

(Continued)

*Primary Examiner* — John Rivell
*Assistant Examiner* — Minh Le
(74) *Attorney, Agent, or Firm* — Hartman & Hartman, P.C.; Gary M. Hartman; Domenica N. S. Hartman

(57) ABSTRACT

A pilot valve assembly for regulating the output of a first pressure source relative to a second pressure source, a fluid system equipped with the valve assembly, and a method of operating the valve assembly. The valve assembly includes a valve body with inlet and outlet ports and first and second sensing ports. The first and second sensing ports are adapted to sense, respectively, the fluid pressures of the first and second pressure sources. The inlet port is adapted for fluidically connecting to the first pressure source. The valve assembly defines a flow path between the inlet and outlet ports, and has components for allowing fluid flow from the inlet port, through the flow path, and to the outlet port only if the fluid pressure of the first pressure source exceeds the fluid pressure of the second pressure source by a differential by the flow-allowing components.

12 Claims, 3 Drawing Sheets

U.S. PATENT DOCUMENTS

| | | | |
|---|---|---|---|
| 6,923,205 B2 * | 8/2005 | Callies | 137/495 |
| 6,991,041 B2 * | 1/2006 | Laskaris et al. | 169/14 |
| 6,814,099 B2 * | 11/2004 | Shen | 137/505.18 |
| 6,923,205 B2 * | 8/2005 | Callies | 137/495 |
| 6,991,041 B2 * | 1/2006 | Laskaris et al. | 169/14 |
| 7,086,841 B2 * | 8/2006 | Cornwell | 417/290 |
| 7,255,126 B2 * | 8/2007 | Arlinghaus, Jr. | 137/495 |
| 2008/0196773 A1 * | 8/2008 | Franconi | 137/492.5 |

* cited by examiner

PILOT VALVE, METHOD OF USING, AND FLUID SYSTEM EQUIPPED THEREWITH

CROSS REFERENCE TO RELATED APPLICATIONS

This application claims the benefit of U.S. Provisional Application No. 61/061,248, filed Jun. 13, 2008, the contents of which are incorporated herein by reference.

BACKGROUND OF THE INVENTION

The present invention generally relates to pilot valves, and more particularly to a pilot valve suitable for controlling the outlet pressure of a pump, such as an air compressor that can be adapted for installation on a vehicle.

Pilot valves are widely used for controlling the operation of valves through which fluids flow at high pressures and/or flow rates. A pilot valve generally operates to control the higher pressure/flow valve with a fluid at a relatively lower pressure and/or flow rate, thereby achieving the control of a high pressure/flow fluid that would otherwise require a much larger force to control.

Utility vehicles and emergency vehicles are often equipped with pneumatic systems, and therefore benefit from an on-board air compressor. Such air compressors may be powered by a power take-off (PTO) shaft driven by the engine of the vehicle. As with other fluid systems that deliver and contain a fluid at a high pressure or flow rate, the output of such an air compressor is preferably regulated at a prescribed level deemed safe and appropriate for the intended use of the compressed air.

BRIEF DESCRIPTION OF THE INVENTION

The present invention provides a pilot valve assembly equipped with multiple inputs for regulating the output of a fluid pressure source, such as an air compressor or other fluid pump. The invention further provides a system equipped with such a pilot valve assembly, and a method of operating the pilot valve assembly.

According to a first aspect of the invention, the pilot valve assembly is adapted for regulating a fluid pressure of a first pressure source relative to a fluid pressure of a second pressure source. The pilot valve assembly includes a valve body comprising an inlet port, an outlet port, and first and second sensing ports. The first and second sensing ports are adapted to sense, respectively, the fluid pressures of the first and second pressure sources. The inlet port is adapted for fluidically connected to the first pressure source. The pilot valve assembly further includes a flow path through the valve body and between the inlet and outlet ports, and means for allowing fluid flow from the inlet port, through the flow path, and to the outlet port if the fluid pressure of the first pressure source exceeds the fluid pressure of the second pressure source by a pressure differential pre-established by the flow-allowing means.

Other aspects of the invention include a system in which the pilot valve assembly is installed, and a method of regulating the fluid pressure of the first pressure source relative to the fluid pressure of the second pressure source with the pilot valve assembly. The method includes installing the pilot valve assembly in a fluid system comprising the first and second pressure sources, fluidically connecting the first and second sensing ports for sensing, respectively, the fluid pressures of the first and second pressure sources, and fluidically connecting the inlet port to the first pressure source. The pilot valve assembly is then operated to maintain the fluid pressure of the first pressure source at or within the pre-established pressure differential relative to the fluid pressure of the second pressure source.

Other aspects and advantages of this invention will be better appreciated from the following detailed description.

DETAILED DESCRIPTION OF THE INVENTION

Figure 1:
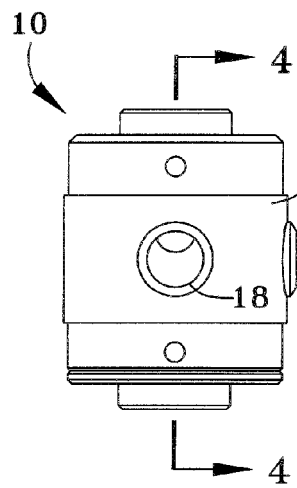
FIGS. 1, 2 and 3 are three exterior views of a pilot valve assembly in accordance with an embodiment of this invention.
Figure 2:
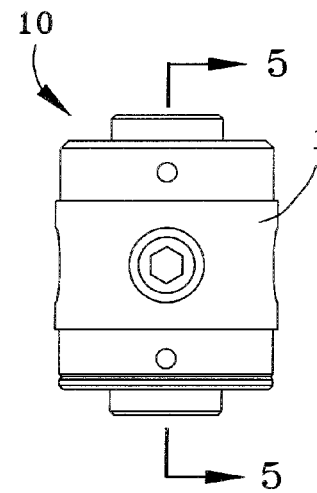
Figure 3:
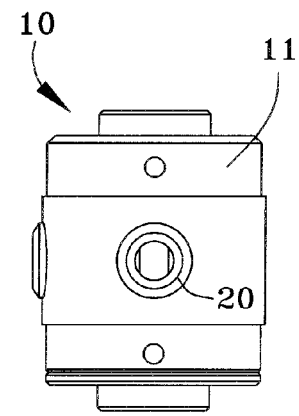
Figure 4:
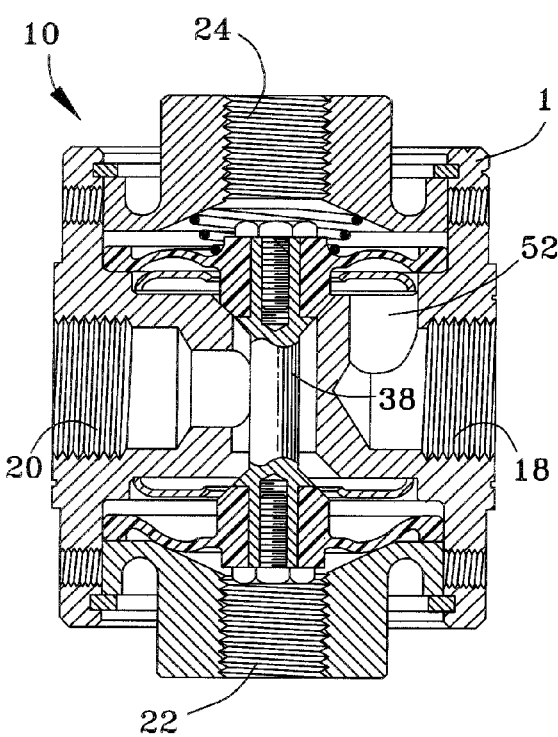
FIG. 4 represents a cross-sectional view of the valve assembly of FIG. 1 along section line 4-4.
Figure 5:
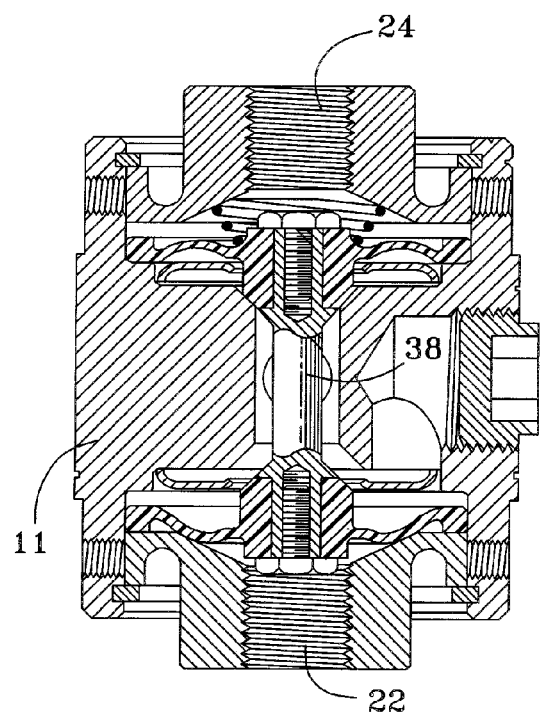
FIG. 5 represents a cross-sectional view of the valve assembly of FIG. 2 along section line 5-5.
Figure 6:
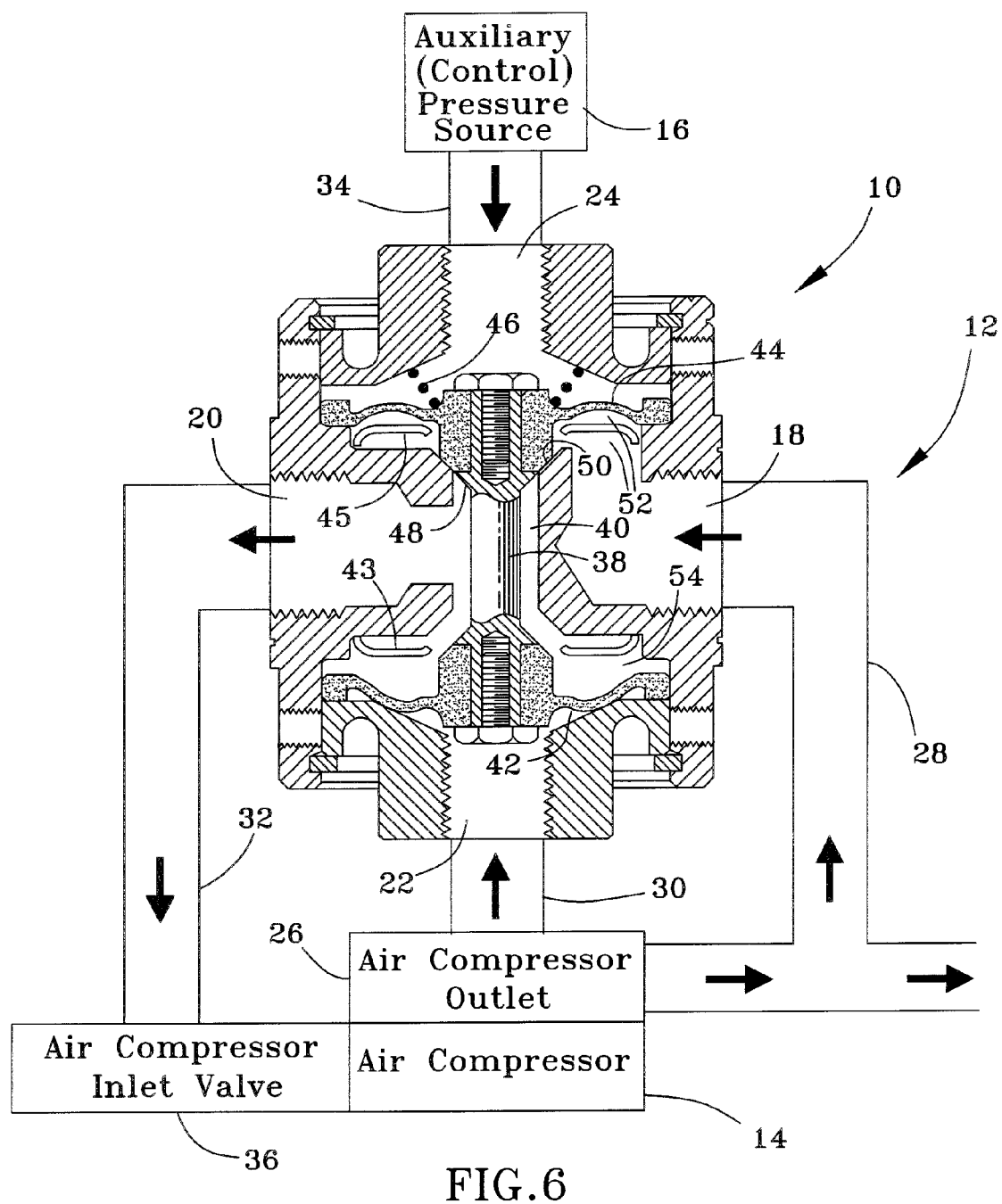
FIGS. 6 and 7 schematically represent the pilot valve assembly of FIGS. 1 through 5 installed in an air compressor system to regulate the output pressure of the system.
Figure 7:
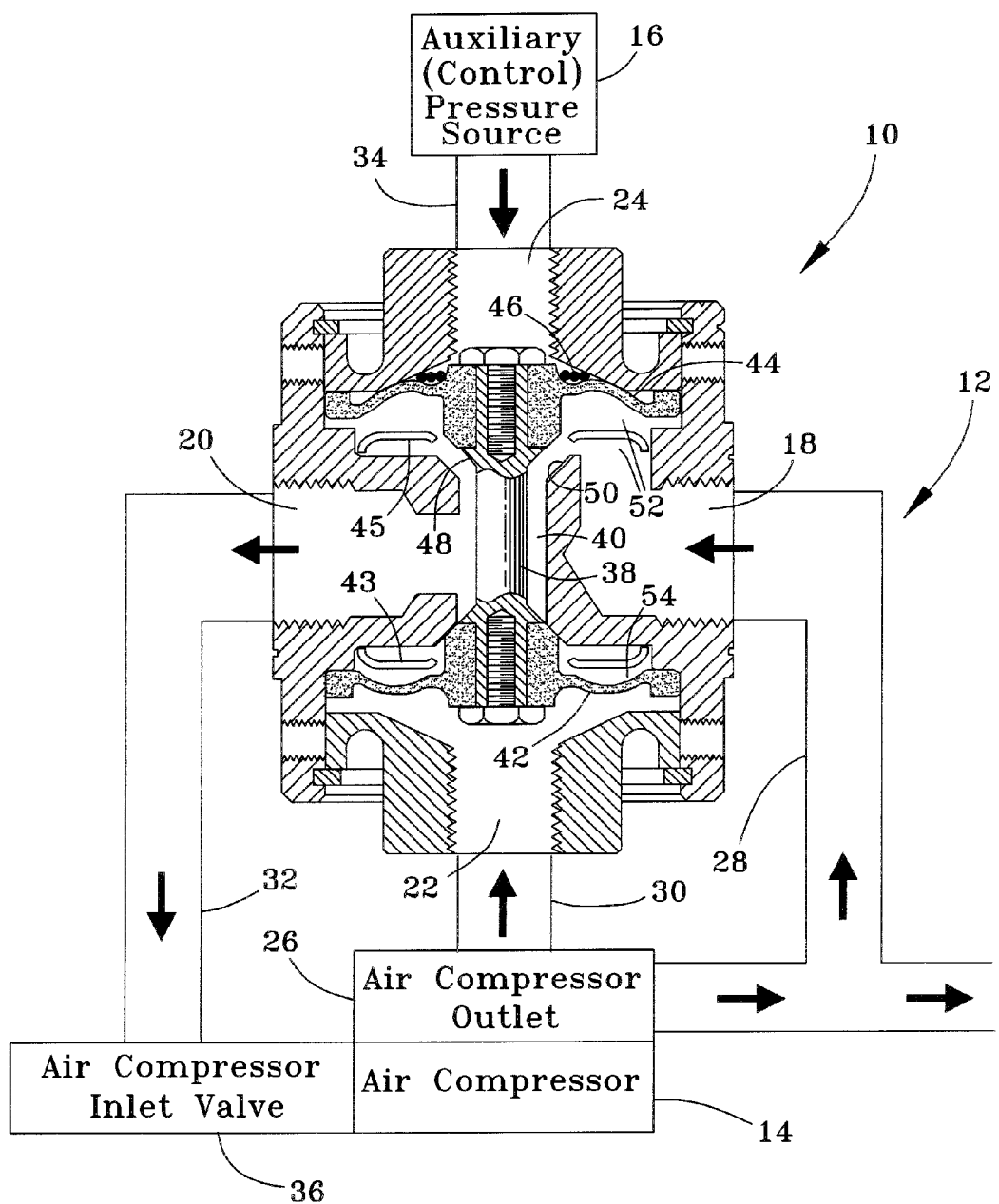

FIGS. 1 through 5 represent a pilot valve assembly 10 adapted to regulate a pressurized fluid based on a pressure other than that of the regulated pressurized fluid. FIGS. 6 and 7 schematically represent an embodiment of the invention in which the valve assembly 10 is installed in an air compressor system 12, which may be installed on a vehicle (not shown) or any other platform having an appropriate pressurized fluid system. The valve assembly 10 regulates the air pressure produced by an air compressor 14 of the system 12 by monitoring the output pressure of the air compressor 14, as well as a pressure from an auxiliary pressure source 16 other than the compressor 14. The valve assembly 10 is configured so that pressure fluctuations in the auxiliary pressure source 16 cause the valve assembly 10 to automatically adjust the output pressure of the air compressor 14, thereby regulating the air pressure of the system 12. The valve assembly 10 can be employed to regulate the air compressor system 12 at a higher pressure than that of the auxiliary pressure source 16. For example, the valve assembly 10 can be used to regulate the system pressure at pressures of up to 5 psi (about 0.3 bar) or more above the monitored pressure of the auxiliary pressure source 16. Depending on the particular application, the auxiliary pressure source 16 may be a variety of fluids (liquid or gas), including but not limited to water, air, and oil.

A nonlimiting example of a suitable application for the present invention is a compressed air foam system (CAFS) of an emergency vehicle equipped to fight fires with a fire retardant foam. In such a system, the auxiliary pressure source 16 would be a water pumping system whose water pressure is used by the valve assembly 10 to regulate the output of the air compressor 14. The outlet of the compressor 14 is plumbed to introduce the compressed air into the water pumped by the water pumping system, which in turn contains a foam solution to generate the fire retardant foam. The desire is to regulate the air pressure from the compressor 14 relative to the water pressure into which the air is introduced to produce the fire retardant form.

The pilot valve assembly 10 is represented as a normally closed valve with a valve body 11 that defines four ports: an inlet port 18, an outlet port 20, and two sensing ports 22 and 24. A first 22 of the sensing ports 22 and 24 is adapted to sense the pressure of the regulated pressurized fluid, for example, the outlet air pressure of the air compressor 14 in FIG. 6. The second sensing port 24 is adapted to sense the pressure of a separate source, for example, the auxiliary pressure source 16 in FIG. 6. In FIG. 6, a conduit 28 fluidically connects the inlet port 18 to the outlet 26 of the compressor 14, while the first sensing port 22 is also fluidically connected to the compressor outlet 26 through a separate conduit 30. A third conduit (or regulation control line) 32 is shown fluidically connecting the outlet port 20 of the valve assembly 10 to an inlet valve 36 of the compressor 14. Finally, the second sensing port 24 is fluidically connected to the auxiliary pressure source 16 through a fourth conduit 34. The ports 18, 20, 22 and 24 are represented as being threaded to allow for connecting the conduits 28, 30, 32 and 34 to the valve body 11 with threaded fittings (not shown), though the use of any other fluidic coupling means is also within the scope of the invention.

The pilot valve assembly 10 is shown as having a valve stem 38 disposed within a bore 40 whose opposite ends define or are otherwise fluidically coupled with the first and second sensing ports 22 and 24. Diaphragms 42 and 44 are mounted on the stem 38 and disposed within the ends of the bore 40 associated with the first and second sensing ports 22 and 24, respectively. The diaphragms 42 and 44 fluidically separate the sensing ports 22 and 24 from the bore 40. Supports 43 and 45 are disposed within the bore 40 to limit movement of the diaphragms 42 and 44, respectively. In the embodiment shown in the Figures, the diaphragms 42 and 44 are represented as being approximately equal in effective surface area, such that the forces on the stem 38 are approximately balanced when the diaphragms 42 and 44 are subjected to equal pressures from the air compressor 14 and auxiliary pressure source 16. However, the end of the stem 38 associated with the second sensing port 24 is equipped with a spring 46 that biases the stem 38 toward the first sensing port 22, generating a force differential to engage a tapered boss 48 against a valve seat 50 within the valve body 11. The boss 48 is shown as being defined in part by a portion of the diaphragm 44 and in part by a portion of the stem 38, though the boss 48 could be entirely formed by either of these components or by an entirely separate component mounted on the stem 38. Other aspects of the construction of the valve assembly 10 should be apparent from the Figures or otherwise not critical to the operation of the valve assembly 10, and therefore will not be described in any detail here.

As evident from FIGS. 4 through 7, the force generated by the spring 46 establishes a pressure differential that is required at the first and second sensing ports 22 and 24 to move the boss 48 off the seat 50, which (as represented in FIG. 7) allows air from the air compressor 14 to flow from the inlet port 18, through a passage 52 (via the diaphragm support 45) defined in part by the diaphragm 44, between the boss 48 and seat 50, through the bore 40, and out of the valve body 11 through the outlet port 20. As such, the mechanical properties, dimensions and installation of the spring 46 within the valve body 11 determine the pressure differential between the sensing ports 22 and 24, and therefore the desired regulated pressure of the compressor 14 relative to the pressure of the auxiliary pressure source 16. As evident from FIG. 6, which shows the valve assembly 10 in its normally closed position, while the difference between the regulated pressure of the air compressor 14 and the pressure of the auxiliary pressure source 16 is below the pressure differential established by the spring 46, the boss 48 remains abutted against the seat 50 to prevent air flow from the inlet port 18 to the outlet port 20 of the valve body 11. Air pressure is not delivered to the inlet valve 36 of the air compressor 14 until the pressure of the outlet 26 sensed by the first sensing port 22 exceeds the pressure of the auxiliary pressure source 16 sensed by the second sensing port 24 by the pressure differential established by the spring 46, an nonlimiting example being 5 psi (about 0.3 bar). In the system 12 represented in FIGS. 6 and 7, when this pressure differential is exceeded, air flow from the outlet port 20 directs pressure to the conduit (regulation control line) 32 of the inlet valve 36, forcing the compressor inlet valve 36 to close and thereby not allowing the outlet air pressure of the air compressor 14 to further rise.

If the pressure of the auxiliary pressure source 16 sensed by the second sensing port 24 were to experience a pressure drop, the valve assembly 10 will remain open until the air pressure produced by the compressor 14 drops to achieve the pressure differential relative to the pressure at the second sensing port 24. If the second sensing port 24 pressure were to rise, the pathway defined by the boss 48 and seat 50 between the inlet port 18 and outlet port 20 closes through the action of the diaphragm 44, allowing the compressor inlet valve 36 to open and causing the air pressure generated by the compressor 14 to rise until the air pressure overcomes both the diaphragm 44 and spring 46 at the second sensing port 24. At this time, the pathway defined by the boss 48 and seat 50 between the inlet port 18 and outlet port 20 will open and send air pressure to the control regulation line 32 of the compressor inlet valve 36, closing the inlet valve 36 of the compressor 14 to thereby maintain a constant air pressure until the pilot valve assembly 10 again senses a pressure drop or increase at either the compressor outlet 26 or the auxiliary pressure source 14.

While the invention has been described in terms of a specific embodiment, it is apparent that other forms could be adopted by one skilled in the art. For example, the physical configuration of the valve assembly 10 could differ from that shown. Furthermore, it is foreseeable that functionally-equivalent components could be used in place of the stem 38, diaphragms 42 and 44, spring 46, etc., as well understood by those skilled in the art. In addition, the assembly 10 could find uses in a wide variety of applications other than those noted. Therefore, the scope of the invention is to be limited only by the following claims.

The invention claimed is:

1. A pilot valve assembly adapted for regulating a fluid pressure of a first pressure source relative to a fluid pressure of a second pressure source, the pilot valve assembly comprising:
    a valve body comprising an inlet port, an outlet port, and first and second sensing ports, the first and second sensing ports being adapted to sense, respectively, the fluid pressures of the first and second pressure sources, the inlet port being adapted for fluidically connecting to the first pressure source;
    a flow path through the valve body and between the inlet and outlet ports; and
    means for allowing fluid flow from the inlet port, through the flow path, and to the outlet port only if the fluid pressure of the first pressure source exceeds the fluid pressure of the second pressure source by a differential pre-established by the flow-allowing means.

2. The pilot valve assembly according to claim 1, wherein the differential pre-established by the flow-allowing means is up to about 0.3 bar.

3. The pilot valve assembly according to claim 1, wherein the flow-allowing means comprises a stem disposed within a bore of the valve body, a first diaphragm coupled to the stem and responsive to the pressure of the first pressure source, a second diaphragm coupled to the stem and responsive to the pressure of the second pressure source, a valve seat within the valve body, a boss adapted to engage the valve seat and thereby close the flow path, and a spring that biases the boss into engagement with the valve seat.

4. The pilot valve assembly according to claim 1, wherein the pilot valve assembly is installed in a fluid system comprising the first and second pressure sources, the first and second sensing ports are fluidically connected for sensing, respectively, the fluid pressures of the first and second pressure sources, and the inlet port is fluidically connected to the first pressure source.

5. The pilot valve assembly according to claim 4, wherein the outlet port is fluidically connected to an inlet valve of the first pressure source that determines the fluid pressure of the first pressure source.

6. The pilot valve assembly according to claim 4, wherein the fluid system is installed on a vehicle.

7. The pilot valve assembly according to claim 6, wherein the fluid system is a compressed air foam system, the first pressure source is an air compressor, and the second pressure source is a water pumping system.

8. A method of regulating the fluid pressure of the first pressure source relative to the fluid pressure of the second pressure source with the pilot valve assembly of claim 1, the method comprising installing the pilot valve assembly in a fluid system comprising the first and second pressure sources, the first and second sensing ports being fluidically connected for sensing, respectively, the fluid pressures of the first and second pressure sources, and the inlet port being fluidically connected to the first pressure source.

9. The method according to claim 8, further comprising fluidically connecting the outlet port to an inlet valve of the first pressure source that determines the fluid pressure of the first pressure source.

10. The method according to claim 8, wherein the pilot valve assembly operates to:
- allow the fluid flow from the inlet port, through the flow path, and to the outlet port when the fluid pressure of the first pressure source increases to exceed the fluid pressure of the second pressure source by the differential pre-established by the flow-allowing means;
- prevent the fluid flow through the flow path when the fluid pressure of the first pressure source decreases so as not to exceed the fluid pressure of the second pressure source by the differential pre-established by the flow-allowing means;
- allow the fluid flow from the inlet port, through the flow path, and to the outlet port when the fluid pressure of the second pressure source decreases so that the fluid pressure of the first pressure source exceeds the fluid pressure of the second pressure source by the differential pre-established by the flow-allowing means; and
- prevent the fluid flow through the flow path when the fluid pressure of the second pressure source increases so that the fluid pressure of the first pressure source does not exceed the fluid pressure of the second pressure source by the differential pre-established by the flow-allowing means.

11. The method according to claim 8, wherein the system is installed on a vehicle.

12. The method according to claim 8, wherein the system is a compressed air foam system, the first pressure source is an air compressor, and the second pressure source is a water pumping system.

* * * * *